[11] 3,572,906

[72] Inventors Sotirios C. Kitsopoulos
 Summit;
 Rembert R. Stokes, Middletown; Werner
 Thommen, Marlboro, N.J.
[21] Appl. No. 734,745
[22] Filed June 5, 1968
[45] Patented Mar. 30, 1971
[73] Assignee Bell Telephone Laboratories, Incorporated
 Murray Hill, Berkeley Heights, N.J.

[54] AUTOMATIC ELECTRORESPONSIVE LIGHT REGULATOR UTILIZING TRANSLATIONAL DRIVE MOTOR
 5 Claims, 3 Drawing Figs.
[52] U.S. Cl............................................ 350/269,
 95/64
[51] Int. Cl............................................. G02f 1/30
[50] Field of Search........................................ 350/269,
 271, 272; 95/64 (D), 10 (C)

[56] References Cited
 UNITED STATES PATENTS
| | | | |
|---|---|---|---|
| 2,206,086 | 7/1940 | Galyon | 95/64(D) |
| 2,225,714 | 12/1940 | Sachtleben | 350/271 |
| 3,242,796 | 3/1966 | Strickler | 350/271X |

Primary Examiner—Ronald L. Wibert
Assistant Examiner—Orville B. Chew, II
Attorneys—R. J. Guenther and William L. Keefauver ABSTRACT: The effects of friction and vibration are eliminated from an automatically regulated iris, optical filter, or similar arrangement by employing an electroresponsive drive motor with translational drive means. Iris blades or the like are secured to flexible members, the flexure of which is varied by translational motion of the drive system in response to low-power control signals. With this construction, sliding friction is avoided and the system is virtually nonresponsive to vibration.

PATENTED MAR 30 1971　　　3,572,906

INVENTORS  S.C. KITSOPOULOS
R.R. STOKES
W. THOMMEN

BY G.E. Hirsch Jr.
ATTORNEY

AUTOMATIC ELECTRORESPONSIVE LIGHT REGULATOR UTILIZING TRANSLATIONAL DRIVE MOTOR

BACKGROUND OF THE INVENTION

1. Field of the Invention

This invention relates to electroresponsive regulators and more specifically relates to regulated iris or optical filter devices.

In television and in still or motion picture photography, an iris or variable density filter is commonly employed in conjunction with a lens system to regulate the intensity of light focused on a section of photographic film or other photosensitive surface. In many cameras the iris or filter is manually adjusted to the desired light conductivity or aperture size; but in others the mechanism should preferably be electrically controlled. For example, automatic light-sensitive cameras for home use frequently include an electrical iris under control of a photosensitive element. Such systems have become extremely popular and important.

2. Prior Art

Electrically adjusted filters and irises are often controlled by motor-operated gear or crank drive systems. Such systems are undesirable because they require substantial power and because the friction inherent in their operation generates minute free particles which tend to alter the iris' responsiveness. Other iris or filter mechanisms are driven by electrical meter movements which consume less power and operate with reduced mechanical friction. However, such meter systems are susceptible to unstable vibration. In addition, such systems may employ one fixed and one movable iris blade so that the iris center is not always coincident with the optical center of the associated lens structure.

Thus, it is a primary object of the present invention to eliminate the effects of friction and vibration in a reliable low-power electroresponsive iris or variable density filter.

SUMMARY OF THE INVENTION

In attaining this and related objects and in accordance with the invention a low friction regulated iris, optical filter, or similar device is constructed with a pair of aperture controlling elements or light-regulating elements and a solenoid, electroresponsive motor of other translational drive means. The aperture controlling or light-regulating elements are mounted on a pair of elongate beam members which are maintained in contact with one or more flexible wire members. The flexure of the wire members is selectively varied by the translational motion of the drive means to alter the angle between the elongate beam members and hence the alignment of the aperture controlling or other light-regulating means. Translational motion of the drive means is regulated by signals from an appropriate control device.

BRIEF DESCRIPTION OF THE DRAWING

The invention will be more fully apprehended from the following detailed description of illustrative embodiments thereof in conjunction with the appended drawings in which.

DETAILED DESCRIPTION

Figure 1:
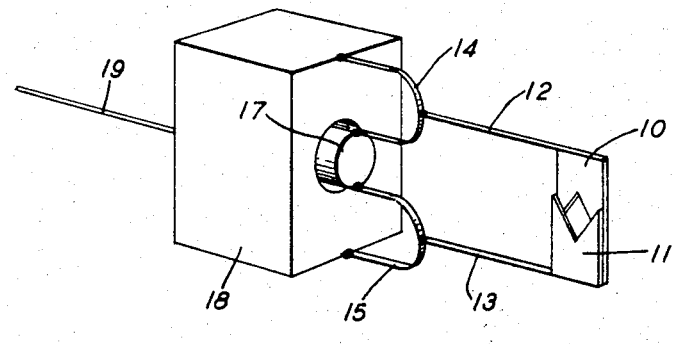
FIG. 1 is an electroresponsive motor-driven iris constructed in accordance with the invention.

The electroresponsive iris shown in FIG. 1 is constructed in accordance with the invention and is suitable for reliable long term operation. The system operates with low mechanical friction under control of electroresponsive motor 18 which may be, for example, a speaker motor of a type well known in the communications art.

Electroresponsive motor 18 includes a movable center plate 17, which is contiguous with a wire coil internal to the motor. The wire coil moves within a permanent magnetic field generated within motor 18 in a well-known fashion. Element 17 and its associated coil are mechanically supported within the magnetic field by spring members 14 and 15 in such a manner that element 17 and its associated coil never make physical contact with the motor housing. In this way, all sliding friction is avoided. Spring members 14 and 15 are each securely fastened at one end to the chassis of motor 18. The opposite end of each spring member is secured to plate 17. In a preferred embodiment, springs 14 and 15 may be formed of a single length of spring material flatly secured to element 17.

A pair of rigid beam members, 12 and 13, are secured to flexed spring members 14 and 15 at a point near the flexed springs' centers. The beam members 12 and 13 support appropriate aperture controlling elements, shown in FIG. 1 as iris blades 10 and 11. It is to be understood that these elements need not be iris blades as shown but may also be variable density filters or other control devices which are well known in the photographic and other arts. The aperture controlling means are mounted in such a manner that they will not make contact with one another as beams 12 and 13 are moved together. This may be accomplished by preflexing beams 12 and 13 slightly.

In the operation of the iris shown in FIG. 1, a controlled current is applied to the suspended coil within motor 18 by means of channel 19. This current generates forces in accordance with well-known principles which result in the lateral displacement of the coil and of element 17. This lateral motion equally alters the flexure of flexed members 14 and 15 by an amount determined by the spring constant of spring members 14 and 15 and the power applied to the internal coil. This change in flexure alters the angle between beams 12 and 13 and hence the aperture size between blades 10 and 11. The iris size is thus electrically controlled with negligible friction.

Figure 2:
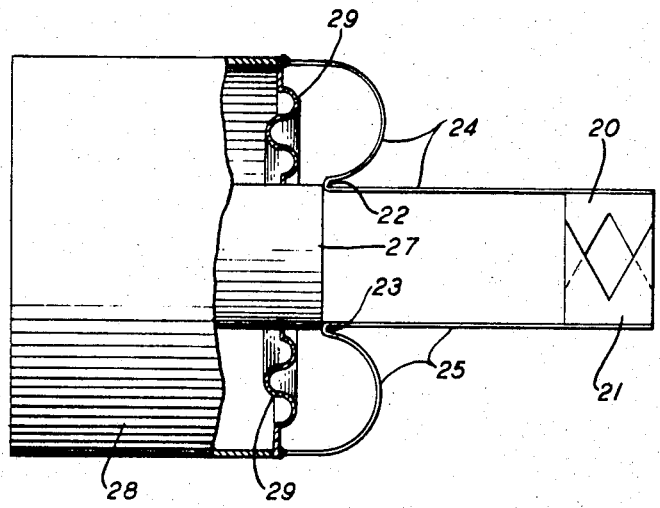
FIG. 2 is an electroresponsive motor-driven iris constructed in accordance with the invention and suitable for low-power operation.

The iris shown in FIG. 2 is similar in principle to that shown in FIG. 1. It includes a speaker motor, 28, and a pair of partially elongate beam members 24 and 25 upon which are mounted appropriate light-controlling means, 20 and 21. However, plate 27, which like plate 17 in FIG. 1 is contiguous with a wire coil internal to the speaker motor, is supported in FIG. 2 by a membrane 29. With this suspension, significantly less force is required to obtain translational motion of element 27 since membrane 29 can be made more pliable than springs 14 and 15 and hence lower power operation is possible. Membrane 29 also acts as a dust shield.

In FIG. 2, the curved and straight portions of member 24 are formed of a single piece of material, as are the corresponding portions of element 25. One end of each such member is rigidly fastened to the chassis of motor 28 and each member is preformed with an elbow at points 22 and 23 respectively. Iris blades 20 and 21 are mounted on the free ends of members 24 and 25. The elbow of members 24 and 25 may be maintained in sliding contact with plate 27 at points 22 and 23, or, in a preferred embodiment, may be pivotally fastened to plate 27. If a sliding contact is employed, some friction is necessarily created by the motion of the elbow over the plate. Similarly, if a pivotal connection is employed, some mechanical friction may be introduced. In either case the friction created is minimal.

In the operation of this iris, the angle between the straight section of member 24 and the arced section of member 24 is maintained relatively constant by the rigidity of the member, as is the angle between the straight and arced portions of element 25. As member 27 moves laterally, the angle between the straight section of member 24 and the straight section of member 25 will vary. This in turn alters the relation of the aperture controlling means which, in FIG. 2, are shown as iris blades 20 and 21. Plate 27 moves reciprocally in response to electrical signals in the same manner as previously described in relation to the iris shown in FIG. 1.

Figure 3:
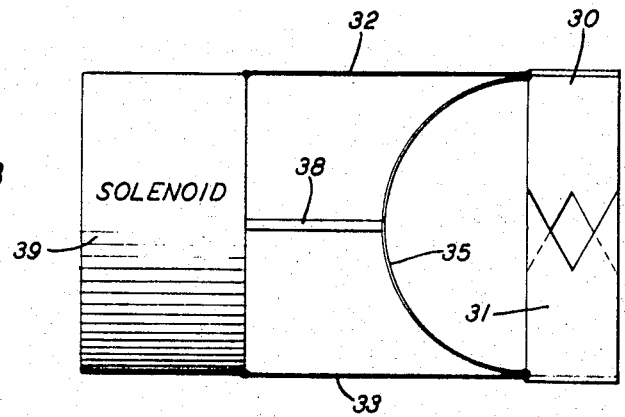
FIG. 3 is an electroresponsive solenoid-driven iris constructed in accordance with the invention.

The iris shown in FIG. 3 operates on principles similar to those described in relation to the iris shown in FIGS. 1 and 2 in that it includes aperture controlling means, 30 and 31, mounted on elongate beam members 32 and 33 which are maintained in close relation to a flexed spring member 35. The flexure of spring member 35 is varied by translational motion of drive source 39 which is under control of signals from a source not shown. As the flexure of spring 35 varies, beams 32 and 33 are moved equally apart, thus altering the relation of the aperture controlling means.

More specifically, in the iris shown in FIG. 3, iris blades 30 and 31 are rigidly fastened to partially flexible beam members 32 and 33 which are in turn secured to the chassis of solenoid drive means 39. A first end of flexed spring member 35 is secured to iris blade 30 where it joins member 32; a second end is secured to blade 31 in a similar manner. A stiff elongate rod, 38, is fastened at one of its ends to the center of flexed member 35; its other end is maintained in contact with the reciprocating element of solenoid drive 39.

Solenoid 39 includes a metallic core element supported with a wire coil in a well-known manner. When current is applied to the coil, not shown, rod 38 is moved laterally. Such lateral motion of rod 38 alters the flexure of member 35 which forces blades 30 and 31 apart and thus alters the size of the aperture between them.

While the electroresponsive iris shown in FIG. 3 is shown with a solenoid drive mechanism, it is to be understood that any suitable lateral motion generator such as a hydraulic ram, pneumatic plunger, or bellows could be employed. Similarly, although aperture controlling means 30 and 31 are shown as specific iris blades, variable density filters, iris blades of a different construction, or other regulating devices could be employed.

It is to be understood that the above-described arrangements are merely illustrative of the application of the principles of the invention. Other arrangements may be devised by those skilled in the art without departing from the spirit or scope of the invention.

We claim:

1. An automatic iris arrangement which comprises:
   translational motion means;
   first and second flexed spring members each having first and second ends, one of said ends being rigidly affixed and the other of said ends being secured to said translational motion means so that movement of said translational motion means alters the flexure of said spring member;
   first and second elongate members supported by said first and second spring members, respectively, in a predetermined spatial relationship;
   first and second iris blades supported by said elongate member; and
   whereby the variation in flexure of said spring members varies the spatial relationship of said elongate members thereby varying in a predetermined manner an aperture formed by said iris blades.

2. The invention as defined in claim 1 wherein said translational motion means includes a solenoid means having an armature supported within said solenoid by said spring members.

3. An automatic iris arrangement which comprises:
   first and second members each having an arced flexed portion at one end and an elongate portion extending to the other end, the arced end of said members being rigidly affixed so that the elongate portions are in a predetermined spatial relationship to one another;
   means having a controllable aperture therein being supported at the elongate ends of said members; and
   reciprocal motion means pivotably attached at the junction of the arced portion and the elongate portion of each of said members so that the motion of said reciprocal motion means varies the flexure of the arced portions of said members thereby altering the spatial relationship of the elongate portions of said members to vary the size of said aperture in a predetermined manner.

4. The automatic iris as defined in claim 3 wherein said reciprocal motion means includes a solenoid means having an armature supported within said solenoid by the flexed portion of said first and second members.

5. The automatic iris as defined in claim 4 further including membrane means for suspending said translational motion member in said predetermined spatial relationship.